US008334845B2

(12) United States Patent
Liu

(10) Patent No.: US 8,334,845 B2
(45) Date of Patent: Dec. 18, 2012

(54) THWARTING SCREEN LOGGING OF KEYPAD IN A WEB-BASED FORM

(75) Inventor: Jack Liu, New Hyde Park, NY (US)

(73) Assignee: Firstrade Securities, Inc, Flushing, NY (US)

( * ) Notice: Subject to any disclaimer, the term of this patent is extended or adjusted under 35 U.S.C. 154(b) by 647 days.

(21) Appl. No.: 12/276,724

(22) Filed: Nov. 24, 2008

(65) Prior Publication Data

US 2010/0127987 A1 May 27, 2010

(51) Int. Cl.
*G06F 3/02* (2006.01)
(52) U.S. Cl. ........ 345/168; 345/157; 345/160; 345/169; 345/173
(58) Field of Classification Search .................. 345/168, 345/173, 156, 157, 160, 169; 455/556.1, 455/550.1, 90.3; 340/5.2; 713/182; 381/73.1; 235/379
See application file for complete search history.

(56) References Cited

U.S. PATENT DOCUMENTS

| | | | |
|---|---|---|---|
| 5,616,900 A * | 4/1997 | Seewoster | 235/379 |
| 6,492,977 B1 * | 12/2002 | Marshall | 345/168 |
| 6,549,194 B1 | 4/2003 | McIntyre et al. | |
| 7,425,946 B1 * | 9/2008 | Britton | 345/168 |
| 7,768,501 B1 * | 8/2010 | Maddalozzo et al. | 345/173 |
| 7,986,921 B2 * | 7/2011 | Hedtke et al. | 455/90.3 |
| 2002/0070923 A1 * | 6/2002 | Levy et al. | 345/169 |
| 2005/0024322 A1 * | 2/2005 | Kupka | 345/156 |
| 2005/0153728 A1 * | 7/2005 | Ronkko | 455/550.1 |
| 2006/0037373 A1 * | 2/2006 | Case et al. | 70/278.1 |
| 2006/0132282 A1 * | 6/2006 | McCall et al. | 340/5.2 |
| 2006/0187211 A1 * | 8/2006 | Uusitalo et al. | 345/169 |
| 2007/0192615 A1 | 8/2007 | Varghese et al. | |
| 2008/0220814 A1 * | 9/2008 | Hedtke et al. | 455/556.1 |
| 2008/0246733 A1 * | 10/2008 | Henty | 345/168 |
| 2009/0066660 A1 * | 3/2009 | Ure | 345/173 |
| 2009/0259588 A1 * | 10/2009 | Lindsay | 705/40 |
| 2011/0022425 A1 * | 1/2011 | Block et al. | 705/5 |
| 2011/0249828 A1 * | 10/2011 | Dickson et al. | 381/73.1 |

OTHER PUBLICATIONS

Johnny Lim, "Defeat Spyware With Anti-Screen Capture Technology Using Visual Persistence," Netrus, 10 Collyer Quay, #09-05, Ocean Building, Singapore 049315, paper, 2 pages, Jul. 2007.

* cited by examiner

*Primary Examiner* — Thuy Pardo
(74) *Attorney, Agent, or Firm* — Patent Law Group LLP; David C. Hsia

(57) ABSTRACT

Characters on an on-screen keypad are hidden once a cursor is placed over the keypad. This prevents any spyware from screen logging the key selection as the characters on the keypad are not visible at the moment a key is selected. The keys of the keypad are optionally color-coded to help a user remember the location of the key with the desired character once the cursor is over the keypad.

18 Claims, 4 Drawing Sheets

THWARTING SCREEN LOGGING OF KEYPAD IN A WEB-BASED FORM

FIELD OF INVENTION

This invention relates to the use of an on-screen keypad to enter sensitive data.

DESCRIPTION OF RELATED ART

FIG. 1 illustrates a network environment 100 for a user on a client device 102 to access services provided by a server computer 104, such as banking and brokerage services. Client device 102 may be a personal computer, a smart phone, and other similar devices. Client device 102 is coupled by a network 106 to server computer 104. Network 106 may be a public network such as the Internet.

Typically server computer 104 provides a webpage with an on-screen keypad 108 for the user to enter sensitive data such as a password, a PIN, a social security number, or a credit card number. While on-screen keypad 108 protects against key logging, it does not protect against screen logging where a spyware takes snapshots of the screen in response to the user's mouse clicks in order to capture the sensitive data being entered. Thus, what is needed is a way to guard against screen logging of the on-screen keypad.

SUMMARY

In accordance with embodiments of the invention, characters on an on-screen keypad are hidden once a cursor is placed over the keypad. This prevents any spyware from screen logging the key selection as the characters on the keypad are not visible at the moment a key is selected.

In one embodiment of the invention, the keys of the keypad are color-coded to help a user to remember the location of the key with the desired character once the cursor is placed over the keypad. In one embodiment, the keypad is moved to a new location after a key is selected. In one embodiment, the keys are reassigned new characters and colors after the keypad is moved to the new location.

BRIEF DESCRIPTION OF THE DRAWINGS

Use of the same reference numbers in different figures indicates similar or identical elements.

DETAILED DESCRIPTION

Figure 1:
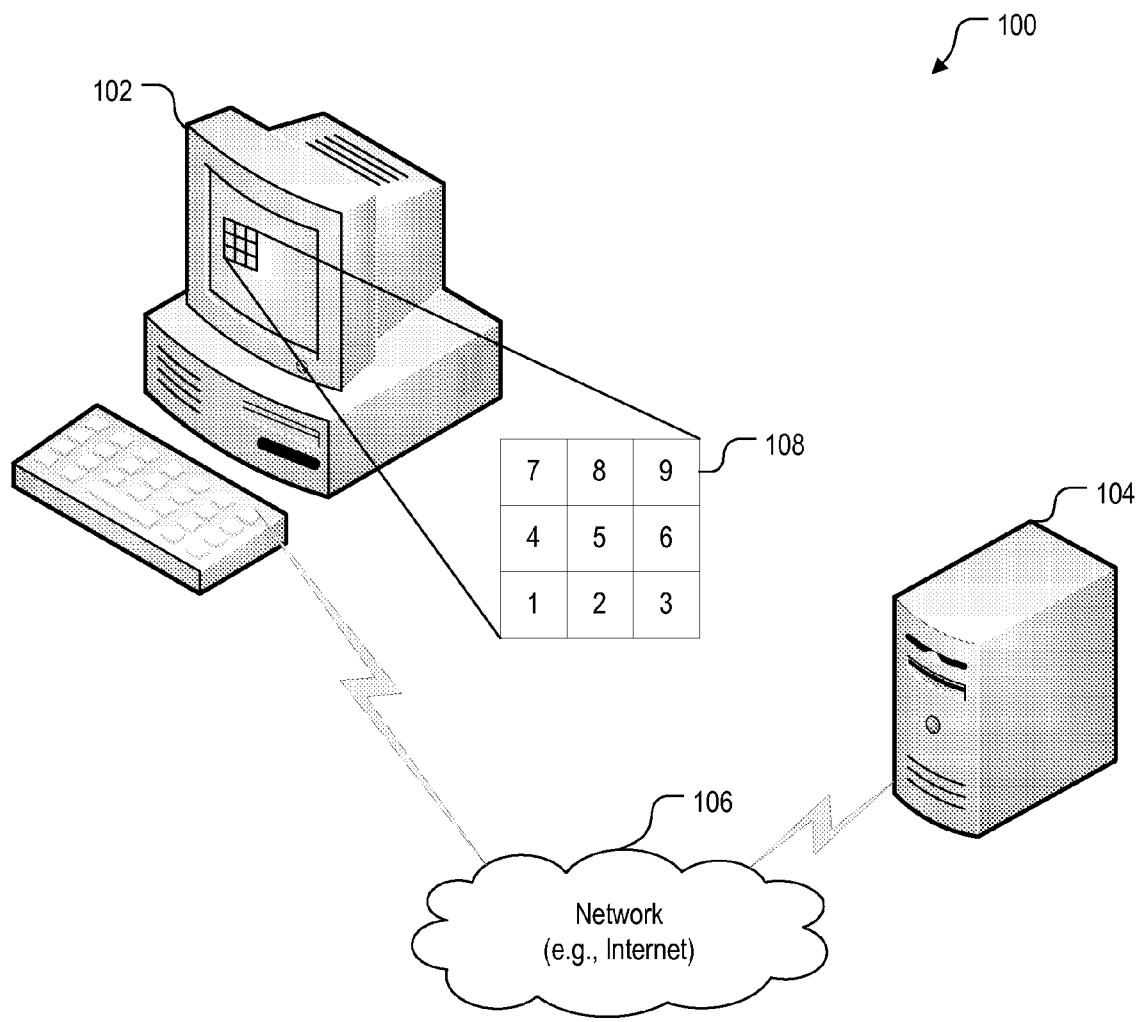
FIG. 1 illustrates a network environment for providing an on-screen keypad.
Figure 2:
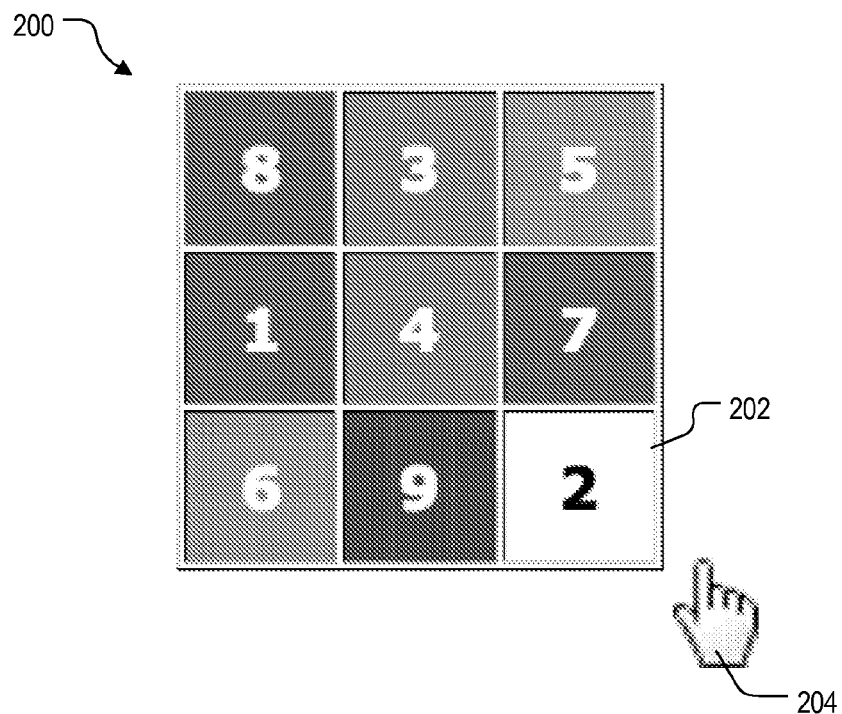
FIGS. 2 and 3 illustrate a rectangular on-screen keypad in one embodiment of the invention.
Figure 3:
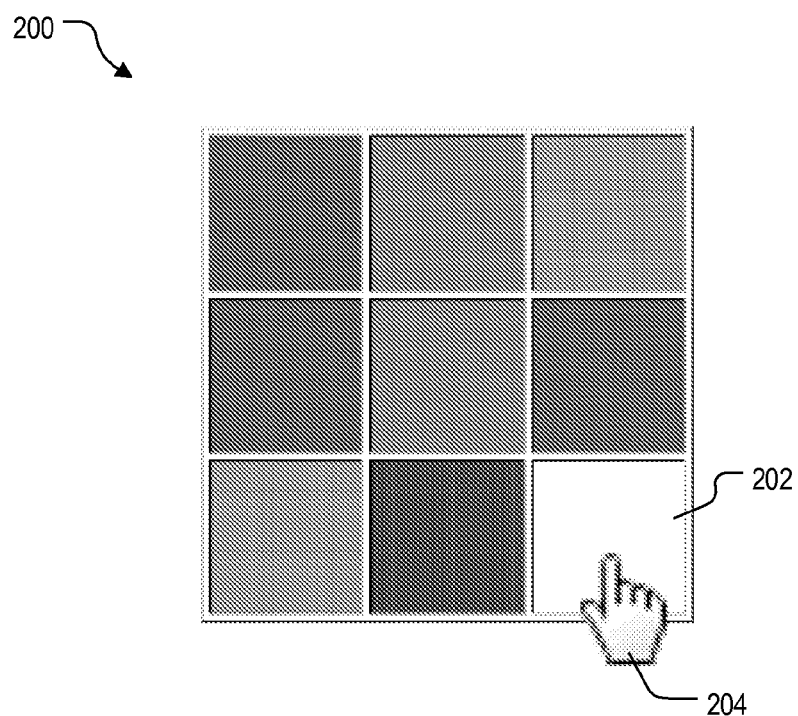

FIGS. 2 and 3 graphically illustrate how an on-screen rectangular keypad 200 functions in one embodiment of the invention. Client device 102 displays keypad 200 on a screen. Keypad 200 has keys 202 (only one is labeled for clarity) arranged in a grid pattern. Keys 202 are assigned visible characters on top of the keys. Keys 202 are also assigned colors. The characters and the colors may be limited to specified sets of characters and colors. Although not expected, the same character or color may be assigned to multiple keys. The user controls a cursor 204 to select keys from keypad 200 to provide a sensitive data to server computer 104.

Referring to FIG. 2, client device 102 displays keys 200 with the assigned colors and the assigned characters anytime cursor 204 is outside of keypad 200. Referring to FIG. 3, client device 102 displays keys 200 with the assigned colors but not the assigned characters anytime cursor 204 is placed over keypad 200. The color coding of keys 202 helps the user to remember the location of the key with the desired character once cursor 204 is over keypad 200.

Figure 4:
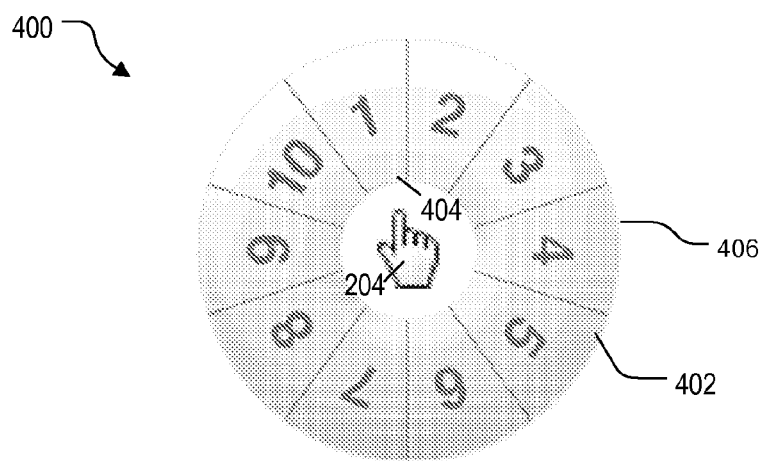
FIGS. 4, 5, and 6 illustrate a circular on-screen keypad in one embodiment of the invention.
Figure 5:
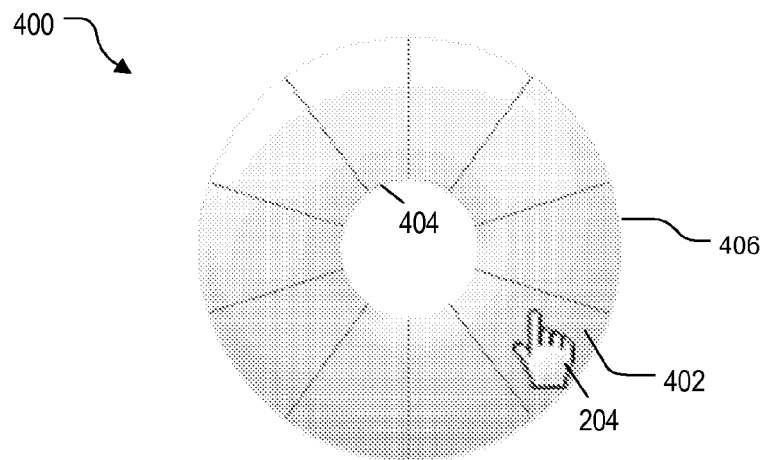
Figure 6:
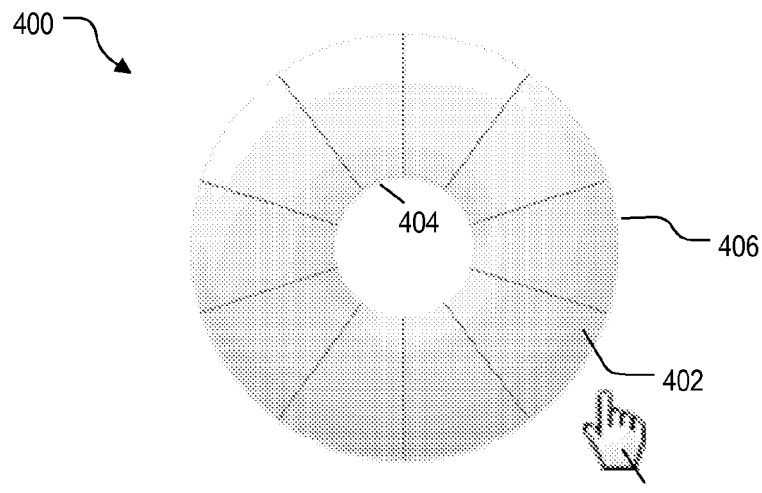

FIGS. 4, 5, and 6 graphically illustrate how an on-screen circular keypad 400 functions in one embodiment of the invention. Like keypad 200, client device 102 displays keypad 400 on a screen. Keypad 400 has keys 402 (only one is labeled for clarity) arranged around a circle between an inner ring 404 and an outer ring 406. Keys 402 are assigned visible characters on top of the keys. Keys 402 are also assigned colors. The characters and the colors may be limited to specified sets of characters and colors. Although not expected, the same character or color may be assigned to multiple keys. Again the user controls cursor 204 to select keys from keypad 400 to provide a sensitive data to server computer 104.

Referring to FIG. 4, client device 102 displays keys 400 with the assigned colors and the assigned characters anytime cursor 204 is inside inner ring 404. Referring to FIG. 5, client device 102 displays keys 400 with the assigned colors but not the assigned characters anytime cursor 204 is placed over keypad 400. Again the color coding of keys 402 helps the user to remember the location of the key with the desired character once cursor 204 is over keypad 200. Referring to FIG. 6, client device 102 continues to display keys 400 with the assigned colors but not the assigned characters anytime cursor 204 is outside of outer ring 406.

Figure 7:
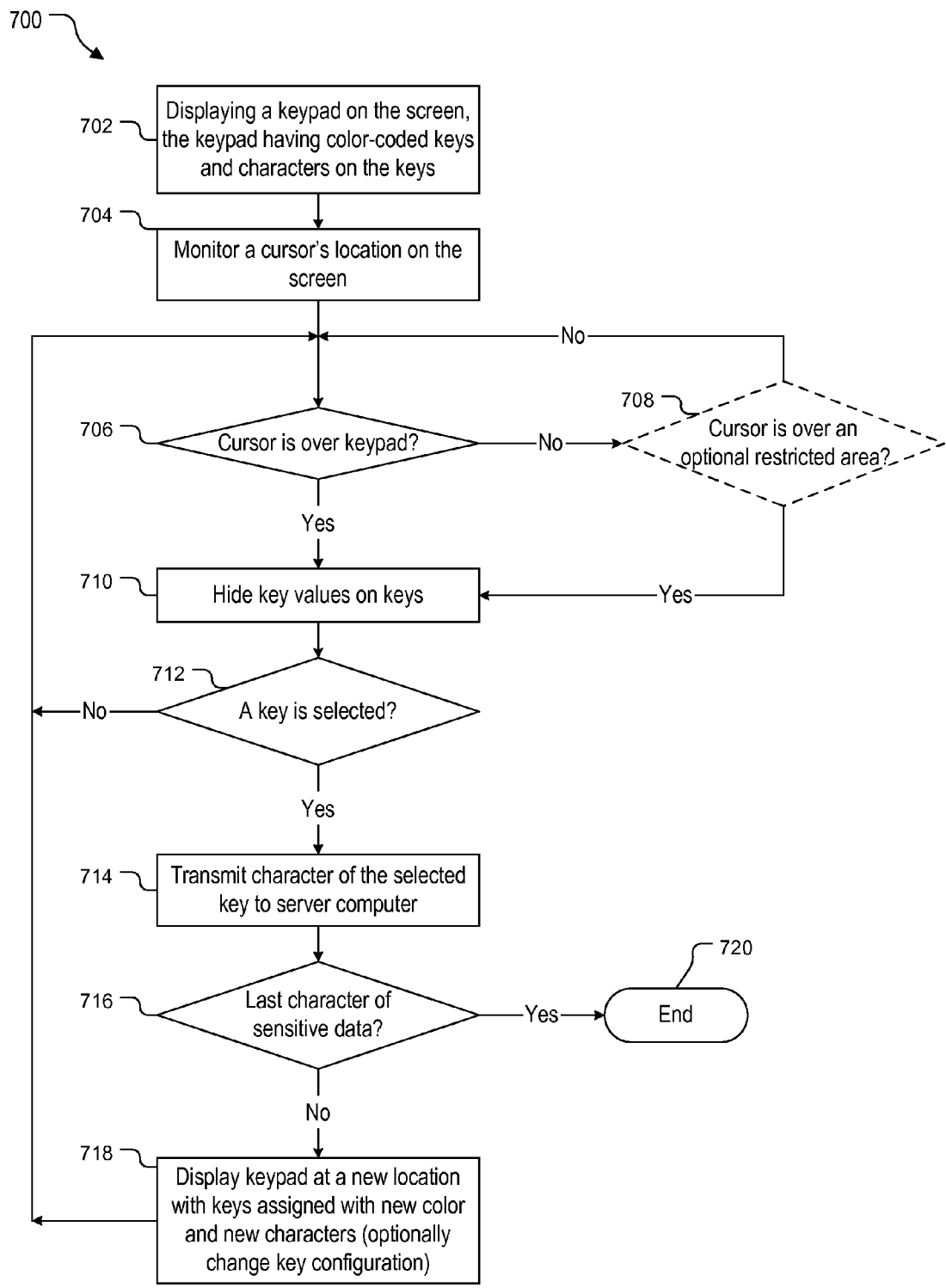
FIG. 7 is a flowchart of a method for implementing the on-screen keypads in one embodiment of the invention.

FIG. 7 is a flowchart of a method 700 for implementing on-screen keypad 200 or 400 in one embodiment of the invention. Method 700 is implemented as code embedded in a webpage (e.g., a web-based form) downloaded by client device 102 from server computer 104 to access a service provided through the server computer. In one embodiment, the code is written in PHP using GD library to create the images of keypad 200 or 400. In client device 102, the code is loaded into memory, executed by a processor, and displayed on a screen.

In step 702, client device 102 displays keypad 200 or 400 on the screen with keys 202 or 402 having initially assigned colors and characters. Step 702 is followed by step 704.

In step 704, client device 102 monitors the location of cursor 204 on the screen. Step 704 is followed by step 706.

In step 706, client device 102 determines if cursor 204 is over keypad 200 or 400. If so, step 706 is followed by step 710. Otherwise step 706 loops back to step 706 for keypad 200 or is optionally followed by step 708 for keypad 400.

In step 708, client device 102 determines if cursor 204 is over an optional restricted area, such as outside of outer ring 406 (FIG. 4). If so, step 708 is followed by step 710. Otherwise step 708 loops back to step 706.

In step 710, client device 102 displays keypad 200 or 400 with keys 202 or 402 having their assigned colors but not their assigned characters. This action thwarts screen logging as the characters on keypad 200 or 400 are not visible at the moment a key is selected. Step 710 is followed by step 712.

In step 712, client device 102 determines if a key is selected using cursor 204. If so, step 712 is followed by step 714. Otherwise step 712 loops back to step 706.

In step 714, client device 102 transmits the character of the selected key to server computer 104. Step 714 is followed by step 716.

In step 716, client device 102 determines if the last character of the sensitive data has been entered. If not, step 716 is followed by step 718. Otherwise step 716 is followed by step 720, which ends method 700. Client device 102 may know that the last character of the sensitive data has been entered if it knows the total number of characters in the sensitive data. Alternatively, the user may select a "finished" button to indicate that all the characters of the sensitive data have been entered.

In step 718, client device 102, client device 102 displays keypad 200 or 400 at a new location on the screen. In one embodiment, keys 202 or 402 are randomly reassigned colors different from before. In one embodiment, keys 202 or 402 are randomly reassigned characters different from before. In one embodiment, client device 102 switches keypad type from keypad 200 to 400, or vice versa. These actions thwart key logging that attempts to determine the sensitive data from the pattern of mouse clicks. Step 718 loops back to step 706.

Various other adaptations and combinations of features of the embodiments disclosed are within the scope of the invention. Numerous embodiments are encompassed by the following claims.

What is claimed is:

1. A method for providing an on-screen keypad on a device, comprising:
    displaying the keypad on a screen, the keypad comprising keys bearing characters;
    monitoring a cursor's location on the screen;
    any time the cursor is placed on the keypad, displaying the keys without the characters; and
    after receiving a selection of one of the keys from the cursor, transmitting the character of the selected key to another device.

2. The method of claim 1, wherein the keys have distinct colors from each other.

3. The method of claim 2, wherein the characters on the keys are distinct from each other.

4. The method of claim 2, further comprising:
    after receiving a selection of one of the keys from the cursor, redisplaying the keypad at a new location on the screen.

5. The method of claim 4, wherein said redisplaying the keypad comprises assigning new characters to the keys.

6. The method of claim 5, wherein said redisplaying the keypad further comprises assigning new colors to the keys.

7. The method of claim 1, wherein the keypad is rectangular and the keys are arranged in a grid pattern.

8. The method of claim 1, wherein the keypad is circular and the keys are arranged in a circle around an inner ring and inside an outer ring.

9. The method of claim 8, wherein:
    said displaying the keypad occurs any time the cursor is placed inside the inner ring; and
    the method further comprises, any time the cursor is placed outside of the outer ring, displaying the keys without the characters.

10. A computer-readable storage medium encoded with computer-executable instructions for providing an on-screen keypad on a device, the instructions comprising:
    displaying the keypad on a screen, the keypad having keys bearing characters;
    monitoring a cursor's location on the screen;
    any time the cursor is placed on the keypad, displaying the keys without the characters; and
    after receiving a selection of one of the keys from the cursor, transmitting the character of the selected key to another device.

11. The medium of claim 10, wherein the keys have distinct colors from each other.

12. The medium of claim 11, wherein the characters on the keys are distinct from each other.

13. The medium of claim 10, wherein the instructions further comprise:
    after receiving a selection of one of the keys from the cursor, redisplaying the keypad at a new location on the screen.

14. The medium of claim 13, wherein said redisplaying the keypad comprises assigning new characters to the keys.

15. The medium of claim 14, wherein said redisplaying the keypad further comprises assigning new colors to the keys.

16. The medium of claim 10, wherein the keypad is rectangular and the keys are arranged in a grid pattern.

17. The medium of claim 10, wherein the keypad is circular and the keys are arranged in a circle around an inner ring and inside an outer ring.

18. The medium of claim 17, wherein:
    said displaying the keypad occurs any time the cursor is placed inside the inner ring; and
    the instructions further comprise, any time the cursor is placed outside of the outer ring, displaying the keys without the characters.

* * * * *